(12) United States Patent
Zhao et al.

(10) Patent No.: US 9,364,787 B2
(45) Date of Patent: Jun. 14, 2016

(54) WET SCRUBBER APPARATUS FOR AMMONIA CAPTURE

(71) Applicant: Ohio State Innovation Foundation, Columbus, OH (US)

(72) Inventors: Lingying Zhao, Dublin, OH (US); Lara Jane S. Hadlocon, Columbus, OH (US); Roderick Manuzon, Frontenac, MO (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 14/538,094

(22) Filed: Nov. 11, 2014

(65) Prior Publication Data
US 2015/0086435 A1      Mar. 26, 2015

Related U.S. Application Data

(63) Continuation of application No. 14/036,140, filed on Sep. 25, 2013, now Pat. No. 8,961,915.

(51) Int. Cl.
| | | |
|---|---|---|
| *B01D 53/58* | (2006.01) | |
| *B01D 53/79* | (2006.01) | |
| *C01C 1/242* | (2006.01) | |

(52) U.S. Cl.
CPC ............... *B01D 53/58* (2013.01); *B01D 53/79* (2013.01); *C01C 1/242* (2013.01); *B01D 2251/506* (2013.01); *B01D 2257/406* (2013.01); *B01D 2258/0266* (2013.01)

(58) Field of Classification Search
CPC ............. B01D 2258/0266; B01D 2251/506; B01D 53/58; B01D 2257/406; B01D 53/79; C01C 1/242
See application file for complete search history.

(56) References Cited

FOREIGN PATENT DOCUMENTS

| DE | 202013002361 U1 * | 5/2013 | ........... B01D 53/343 |
|---|---|---|---|
| JP | 63252530 | 10/1988 | |
| JP | 5285343 | 11/1993 | |
| JP | 6205939 | 7/1994 | |
| JP | 70765 | 1/1995 | |

OTHER PUBLICATIONS

Aparecido, J.B.; Laminar Flow Inside Hexagonal Ducts; Computational Mechanics; 1990; pp. 93-100; 8 pages.
Bandyopadhyay, Amitava; Prediction of the Removal Efficiency of a Novel Two-Stage Hybrid Scrubber for Flue Gas Desulfurization; Chem. Eng. Technol.; 2006; 16 pages.
Bozorgi, Y.; Simulation of a Spray Scrubber Performance with Eulerian/Lagrangian Approach in the Aerosol Removing Process; Journal of Hazardous Materials; 2006; pp. 509-517; 9 pages.
(Continued)

*Primary Examiner* — Timothy Vanoy
(74) *Attorney, Agent, or Firm* — Meunier Carlin & Curfman LLC

(57) ABSTRACT

A device for removing ammonia from a gas stream has a plurality of conduits that divide the gas steam into a plurality of separate gas streams. Spray nozzles located in each of said conduits spray a dilute acid solution into the streams. The acid solution is aqueous sulfuric acid and ammonium sulfate is produced. The conduits are substantially unobstructed enabling the device to create less than 10 Pa back pressure to the gas stream.

24 Claims, 3 Drawing Sheets

(56) References Cited

OTHER PUBLICATIONS

Chen, Lide; Evaluation of Wood Chip-Based Biofilters to Reduce Odor, Hydrogen Sulfide, and Ammonia from Swine Barn Ventilation Air; Journal of the Air & Waste Management Association; 2012; 12 pages.

Jarungthammachote, Sompop; Entropy Generation Analysis for Fully Developed Laminar Convection in hexagonal Duct Subjected to Constant Heat Flux; Elsevier; 2010; pp. 5374-5379; 6 pages.

Jia, Yong; Modeling of Ammonia-Based Wet Flue Gas Desulfurization in the Spray Scrubber; Korean J. Chem. Eng; 2011; pp. 1058-1064; 7 pages.

Johnstone, H.F.; Absorption of Gases by Liquid Droplets; Industrial and Engineering Chemistry; 1939; 9 pages.

Kiil, Soren; Experimental Investigation and Modeling of a Wet Flue Gas Desulfurization Pilot Plant; Ind. Eng. Chem. Res.; 1998; pp. 2792-2806; 15 pages.

Manuzon, R.B.; A Prototype Acid Spray Scrubber for Absorbing Ammonia Emissions from Exhaust Fans of Animal Buildings; American Society of Agricultural and Biological Engineers; 2007; pp. 1395-1407; 14 pages.

Melse, R.W.; Air Scrubbing Techniques for Ammonia and Odor Reduction at Livestock Operations: Review of On-Farm Research in the Netherlands; American Society of Agricultural Engineers; 2005; pp. 2303-2313; 11 pages.

Melse, R.W.; Air Treatment Techniques for Abatement of Emissions from Intensive Livestock Production; The Open Agriculture Journal; 2009; pp. 6-12; 7 pages.

Ndegwa; P.M.; A Review of Ammonia Emission Mitigation Techniques for Concentrated Animal Feeding Operations; Biosystems Engineering; 2008; pp. 453-469; 17 pages.

Philippe, Francois-Xavier; Ammonia Emissions From Pig Houses: Influencing Factors fnd Mitigation Techniques; 2011; pp. 245-260; 16 pages.

Sadasivam, Rajashankar; Fully Developed Forced Convection Through Trapezoidal and Hexagonal Ducts; 1999; pp. 4321-4331; 11 pages.

Shah, S.B.; Design and Evaluation of a Regenerating Scrubber for Reducing Animal House Emissions; American Society of Agricultural and Biological Engineers; 2008; pp. 243-250; 8 pages.

Swartz, E.; Uptake of Gas-Phase Ammonia. 2. Uptake by Sulfuric Acid Surfaces; American Chemical Society; 1999; pp. 8824-8833; 10 pages.

Turgut; Oguz; Experimental and Numerical Study of Turbulent Flow and Heat Transfer Inside Hexagonal Duct; Heat Mass Transfer; 2013; pp. 543-554; 12 pages.

\* cited by examiner

WET SCRUBBER APPARATUS FOR AMMONIA CAPTURE

CROSS REFERENCE TO RELATED APPLICATION

This application is a continuation of and claims the benefit of priority to U.S. patent application Ser. No. 14/036,140, filed Sep. 25, 2013 and hereby incorporated by reference.

FIELD OF THE INVENTION

This invention relates to devices for removing ammonia from a gas stream and recovering the ammonia for the production of fertilizer.

BACKGROUND

Ammonia ($NH_3$) emissions, for example, from animal waste, are the cause of significant concern for both human and animal health. Such emissions further contribute to environmental degradation, such as ecosystem acidification, eutrophication of surface water and formation of particulate matter with a diameter less than 2.5 µm. It is estimated that animal agriculture contributes over 80% of atmospheric ammonia emissions, which the EPA National Emission Inventory calculated to be 2,418,595 tons in 2002. This represents a significant nitrogen nutrient loss to agriculture.

It would be environmentally advantageous to reduce ammonia emissions by recapturing the nitrogen, for example, in the form of ammonium sulfate solution, which can be a good nitrogen fertilizer source. However, known devices and methods, such as packed-bed scrubbers, while proven effective, present too much resistance to airflow to be used effectively with the ventilation fans currently in use in animal production facilities in the United States, for example, in composting houses for poultry waste. Such fans move large volumes of air at low pressures, and cannot overcome the air resistance of a packed bed scrubber. There is clearly a need for an effective scrubber device which can remove and capture ammonia emissions from animal wastes while working in conjunction with ventilation fans as currently used in animal production facilities in the United States, such as poultry waste composting houses.

SUMMARY

The invention comprises a device for removing a substance from a gas stream by spraying a liquid into said gas stream. In an example embodiment, the device comprises a plurality of conduits for dividing the gas stream into a plurality of separate gas streams. The conduits are substantially unobstructed to permit flow of the separate gas streams therethrough without significant resistance. At least one spray nozzle is positioned in each of the conduits for spraying the liquid into each of the separate gas streams, thereby subjecting the entire gas stream to said liquid while it is passing through the conduits. In a particular example, a plenum has an inlet for receiving the gas stream and an outlet in fluid communication with the conduits.

By way of example, the device may further comprise a fan in fluid communication with the plenum for forcing the gas stream through the conduits. In a particular example embodiment, the conduits are vertically oriented. In an additional example, the device comprises a filter positioned within the gas stream upstream of the conduits for removing particulate matter from the gas stream.

In an example embodiment, the device further comprises a reservoir for holding a liquid. The reservoir is in fluid communication with the spray nozzles for spraying the liquid into the plurality of conduits. By way of example, the device also comprises a pump in fluid communication with the reservoir and the nozzles for pumping the liquid from the reservoir to the conduits. In an additional example embodiment, the device comprises an effluent reservoir in fluid communication with the conduits for collecting liquid effluent from the conduits. In an example embodiment, the device may also include an effluent pump in fluid communication with the conduits and the effluent reservoir for pumping the effluent to the reservoir. A demister may be positioned in fluid communication with the conduits for removing liquid from the gas stream exiting the conduits by way of example.

In another example embodiment, the device comprises a plurality of vertically oriented conduits for dividing the gas stream into a plurality of separate gas streams. Each conduit is substantially unobstructed to permit flow of the separate gas streams therethrough without significant resistance. Each conduit has a first and a second end. The first ends of the conduits are in fluid communication with the atmosphere. A plenum has an inlet for receiving the gas stream and an outlet in fluid communication with the second ends of each one of the conduits. A plurality of spray nozzles are positioned one above another in each of the conduits for spraying the liquid into each of the separate gas streams thereby subjecting the entire gas stream to the liquid while it is passing through the conduits.

By way of example, the device may further comprise a fan in fluid communication with the plenum for forcing the gas stream through the plenum and the conduits. In an example embodiment, a demister is in fluid communication with the second ends of the conduits. A filter may be in fluid communication with the plenum for removing particulate matter from the gas stream in an example embodiment.

In a particular example embodiment, the conduits have a hexagonal cross section. The conduits may be arranged adjacent to one another in an array of rows and columns. Each of the columns may comprise four spray nozzles by way of example.

The device may further comprise a reservoir in fluid communication with the nozzles by way of example. The example embodiment may further comprise a pump in fluid communication with the reservoir and the nozzles. Additionally the example embodiment may further comprise an effluent collector in fluid communication with the conduits. The effluent collector may also be in fluid communication with the reservoir in this example. An acid reservoir may be in fluid communication with the reservoir in an example embodiment. The example embodiment may further comprise a pH probe in fluid communication with the reservoir and the nozzles. The pH probe generates signals indicative of the acidity of liquid flowing from the reservoir to the conduits. An electrical conductivity probe may be operatively associated with the reservoir in an example embodiment. The electrical conductivity probe generates signals indicative of a concentration of the substance within the reservoir.

DETAILED DESCRIPTION

Figure 1:
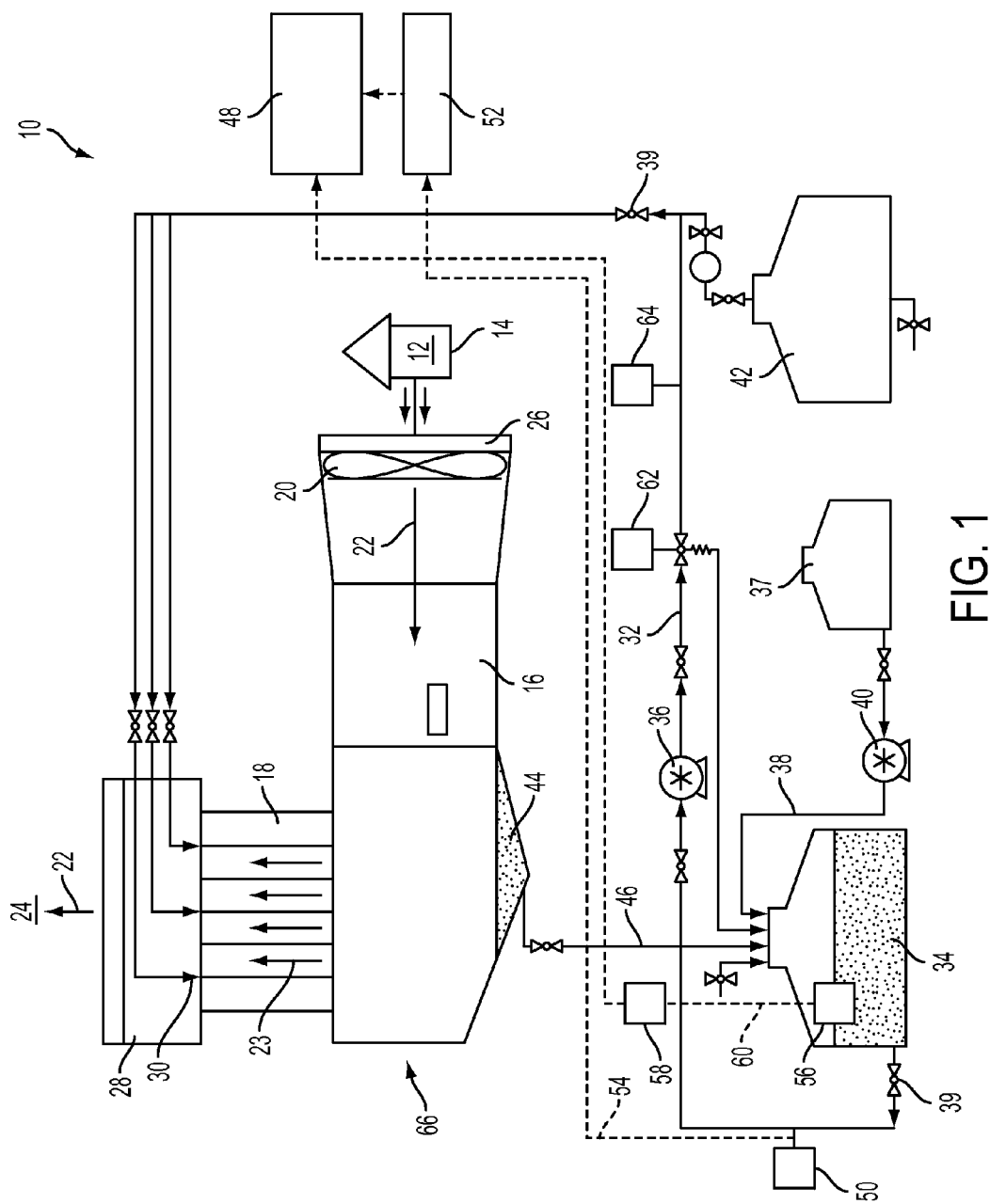
FIG. 1 is a schematic depiction of an example we scrubber device for ammonia capture.

FIG. 1 is a schematic representation of an example embodiment of a we scrubber device 10 for removing ammonia from a gas, for example, air 12 from a composting house 14 for poultry waste. Device 10 comprises a plenum 16 that is in fluid communication with a plurality of conduits 18 mounted atop the plenum 16 and oriented substantially vertically. Plenum 16 is in fluid communication with the composting house 14. Ammonia laden air 12 is drawn from the composting house by a fan 20, which creates a gas stream 22 that enters the conduits 18 where the gas stream is divided into a plurality of separate gas streams and scrubbed of ammonia (described in detail below) before being exhausted to the atmosphere 24. It is advantageous to use a filter 26 in the gas stream to prevent particulate matter from entering the columns. In this example, filter 26 is positioned between the fan 20 and the composting house 14, but other locations upstream of the conduits 18 are also feasible. It is also desirable to mount a demister 28 atop the columns to remove liquid droplets entrained in the gas stream 22 exiting the conduits 18. Example demisters include mesh type coalescers, vane packs, or other structures which aggregate the mist into drops which separate out, the drops being too heavy to be borne on the gas stream.

Scrubbing of the ammonia from the gas stream 22 is effected by spraying an aqueous sulfuric acid solution from nozzles 30 into the conduits 18 where the acid reacts with the ammonia to produce an aqueous solution of ammonium sulfate according to the reaction $2NH_3+H_2SO_4 \rightarrow (NH_4)_2SO_4$. Nozzles 30 are in fluid communication via piping 32 with a reservoir 34 holding the sulfuric acid solution. A pump 36 may be used to convey the acid solution to the nozzles. An acid reservoir 37 is in fluid communication with reservoir 34 via piping 38, the acid reservoir being used to replenish the reservoir 34 as acid is consumed in the reaction. A pump 40 may be used to effect acid transfer from the acid reservoir 37 to the reservoir 34. A storage reservoir 42 is also in fluid communication with the reservoir 34 via piping 32. During operation of the scrubbing device 10, liquid effluent from the scrubbing process, comprised of aqueous ammonium sulfate and unreacted sulfuric acid, is collected in an effluent basin 44 located in the plenum 16 beneath the conduits 18. Effluent basin 44 is in fluid communication with the reservoir 34 via piping 46. The ammonium sulfate solution and the unreacted sulfuric acid are returned to reservoir 34. As described in detail below, this dilutes the sulfuric acid content in reservoir 34 and increases the concentration of ammonium sulfate. When the concentration of ammonium sulfate reaches a desired limit, the contents of the reservoir are pumped, not to the nozzles 30, but to the storage reservoir 42. The reservoir 34 may then be replenished with the aqueous sulfuric acid solution and the process of ammonia scrubbing resumed.

The various fans, pumps and valves that regulate the flow of fluids through device 10 are controlled by a microprocessor based system, such as a programmable logic controller 48. Controller 48 receives various inputs in the form of electrical signals, representative of system parameters, from numerous sensors and transducers positioned throughout the device 10. The sensors include a pH monitor 50 which, in conjunction with a pH controller 52, monitors the acidity of the sulfuric acid/ammonium sulfate solution as it exits the reservoir 34 on its way to the nozzles 30 and supplies this information to the controller 48 over communication lines 54. In a practical application, the Signet DryLoc pH 3-2776 pH monitor and controller as provided by Georg Fischer Signet LLC of Greenfield, Mass., may be used with the device 10. An electrical conductivity probe 56 is located in the reservoir 34 and works in conjunction with an electrical conductivity transmitter 58 to determine the concentration of ammonium sulfate within reservoir 34. Signals indicative of this information are transmitted to the controller 48 via communication lines 60. An example electrical conductivity probe and transmitter useable with the device 10 is Model No. CDTX-45P, provided by Omega Engineering Inc. of Stamford, Conn. Fluid pressure and flow rate in piping 32 are monitored by a pressure transducer 62 and a flow transmitter 64. Their signals are also returned to the controller 48 over communication lines (not shown). Communication lines also connect the pumps 36 and 40 and the various valves 39 with the controller, and as this technology is well understood, it is not shown or described in detail. The communication lines may be hardwired or effected via wireless means.

In a practical example of a full scale device 10 used to treat the ammonia emissions from a composting house 14 processing poultry manure from 828,000 hens, the reservoir 34 comprises a polyethylene tank having a capacity of about 1500 gallons. Acid reservoir 37 is a polyethylene tank of about 500 gallons capacity, and the storage reservoir 42 is a polyethylene tank and has a capacity of about 8,000 gallons. Fan 20 produces an air flow rate up to 720,000 cubic feet per hour. The gas stream from the house has an ammonia concentration between about 100 and 400 ppmv, and it is estimated that the ammonia emission from the composting is approximately 100 tons per year. (It is expected that the device 10 will operate effectively on gas streams having a concentration of ammonia as low as about 10 ppmv.) Pump 36 supplies the solution at a pressure from about 50 psig to about 100 psig, with 90 psig being advantageous as described below. The pump is capable of flow rates of about 1 gpm to about 18 gpm to feed the spray nozzles 30. A flow rate of about 14 gpm is considered advantageous.

Figure 2:
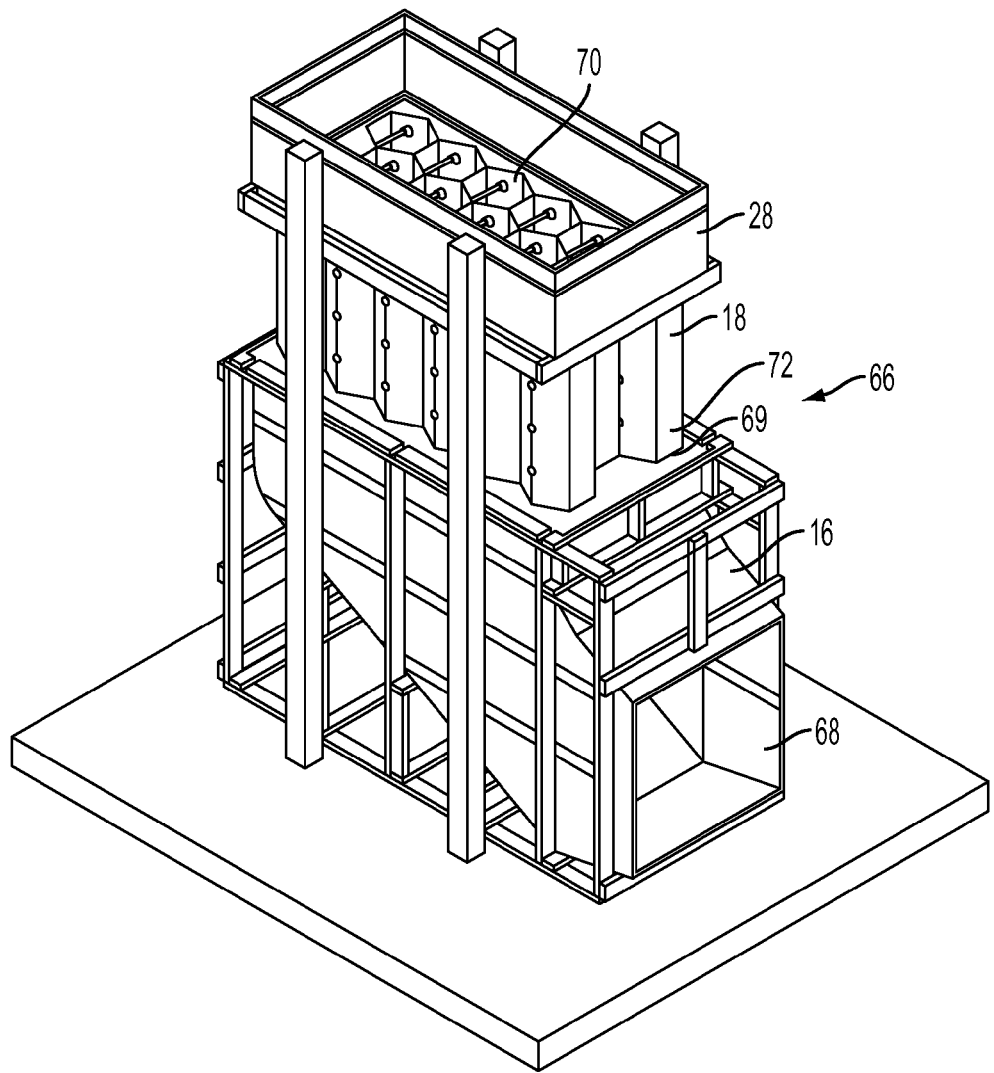
FIG. 2 is an isometric view of a scrubber used in the scrubber device shown in FIG. 1.

FIG. 2 shows a detailed isometric view of an example scrubber 66 used in the full scale practical design of the device 10 described above. Scrubber 66 comprises the plenum 16, made of polyvinylchloride. Plenum 16 has an inlet 68 having a cross sectional area of about 16 square feet, the plenum being about 4 feet in length. Conduits 18, also constructed of polyvinylchloride, are mounted in a vertical orientation atop the plenum 16, the first end 70 of each conduit being in fluid communication with the atmosphere 24, the second end 72 being attached to the plenum 16 and in fluid communication with the plenum exit 69. The conduits are hexagonal in shape and have a height of about 5 feet and a cross sectional area of about 2 square feet. The hexagonal shape is advantageous because it allows for a compact design and efficient use of materials. The demister 28 is mounted atop the conduits 18 proximate to their first ends 70. Total height of the scrubber is about 14 feet. Scrubber 66 presents a resistance of less than 10 Pa back pressure to the fan 20, making it feasible for use with existing equipment in many compost houses found in the United States.

Figure 3:
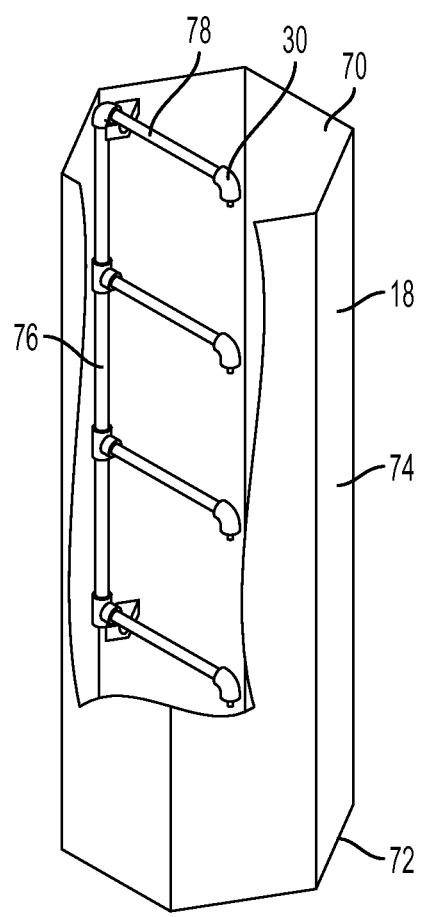
FIG. 3 is an isometric view of a component of the scrubber device shown in FIG. 1.

FIG. 3 shows a conduit 18 in detail. Each conduit 18 is comprised of side walls 74 forming the aforementioned hexagonal cross section. A header pipe 76 is mounted on each conduit 18. The header pipe 76 is in fluid communication with reservoir 34 via piping 32 (see FIG. 1) and supplies the sulfuric acid/ammonium sulfate solution from the reservoir 34 to a plurality of spray nozzles 30 located within each conduit. One or more spray nozzles in each conduit subjects the entire gas stream to the liquid spray. In this example there are four spray nozzles, each fed by a respective branch line 78 connected to the header pipe 76. In a practical design, nozzle Model No. PJ40 supplied by BETE Fog Nozzle, Inc. of Greenfield, Mass., is advantageously used within the conduits 18. The nozzles 30 are fed the sulfuric acid/ammonium sulfate solution at a pressure of about 50-100 psig and produce droplets having a mean size in the range of 110-200 μm. Advantageously, droplets having a mean size range of about 120-130 μm are produced at a nozzle pressure of about 90 psig. Testing has determined that this nozzle, operating at the specified pressure, and producing the droplets as noted above, can achieve ammonia removal as high as 70-85% from air having an ammonia content between about 400 ppmv and 150 ppmv (respectively) at an air flow rate of about 5,400 to about 27,000 cfm and air speeds between about 3 feet/sec to about 15 feet/sec through the conduits. An air speed of about 3 feet/sec is advantageous. An air speed of about 8 feet per second is also feasible in a practical device. The device is also expected to operate at air flow rates as low as 360 cfm, and an air flow rate of about 12,000 cfm is considered advantageous.

Conduits 18 are modular in nature, and the number of conduits may be tailored to meet the capacity needs of a particular installation. In the example shown in FIG. 2, there are 15 conduits, and the scrubber 66 can efficiently treat gas streams with a flow rate from about 5,400 to 27,000 cfm. The conduits are substantially unobstructed to permit flow of the gas streams therethrough without significant resistance, thus enabling a resistance of less than 10 Pa back pressure to the fan 20 to be achieved.

System Operation

With reference to FIG. 1, scrubber device 10 begins operation with reservoir 34 filled with aqueous sulfuric acid at a concentration from about 0.6% to about 2%. Efficient results have been achieved with an acid concentration of about 0.8%. Controller 48 opens the required valves and pump 36 is activated to supply nozzles 30 with the sulfuric acid solution. Contemporaneously, fan 20 is activated by the controller 48, the fan drawing ammonia laden air 12 from the compost house 14 and directing it in a gas stream 22 to the plenum 16. Gas stream 22 passes through the filter 26 where particulate matter is removed. Plenum 16 directs the gas stream 22 into the conduits 18 which divide the gas stream 22 into a plurality of gas streams 23. It was found advantageous to divide the gas stream 22 using individual conduits 18 sized to better control the interaction between the aqueous sulfuric acid spray and the ammonia in the gas stream.

The ammonia reacts with the sulfuric acid according to the reaction $2NH_3+H_2SO_4 \rightarrow (NH_4)_2SO_4$ and a precipitate of aqueous ammonium sulfate and unreacted sulfuric acid is formed and collects in the effluent basin 44. The demister 28 removes additional droplets from the gas stream 22, which exits the conduits 18 to the atmosphere 24, the gas stream now stripped of over 70% of its ammonia content. The precipitate of aqueous ammonium sulfate and unreacted sulfuric acid is returned to the reservoir 34 via piping 46.

As the operation runs on, the concentration of sulfuric acid in reservoir 34 decreases and the concentration of ammonium sulfate increases. To maintain the efficiency of ammonia capture, the pH of the solution pumped to the nozzles is monitored by pH monitor 50, which provides signals indicative of the pH to the controller 48. If the pH approaches 2, the controller activates pump 40, which pumps sulfuric acid from acid reservoir 37 to maintain the pH of the solution in reservoir 34 below 2 and sufficiently acidic for efficient ammonia scrubbing. A pH value of about 1.4 is considered advantageous. Contemporaneously, the electrical conductivity probe 56 monitors the concentration of ammonium sulfate in the reservoir 34. When this concentration reaches a predetermined level, the contents of the reservoir 34 are pumped, not to the nozzles 30, but to the storage reservoir 42 via pump 36 and piping 32. The concentration level at which reservoir 34 is pumped out may be set, for example, at a point which adversely affects the efficiency of the scrubber device 10, or at a point where the solution has a concentration of ammonium sulfate that makes it commercially feasible as a supply for fertilizer manufacture. Tests have shown that an ammonium sulfate concentration of from about 22% to about 36%, and advantageously about 30%, provides a commercially acceptable ammonium sulfate solution without a significant adverse effect on the scrubber efficiency.

What is claimed is:

1. A device for removing a substance from a gas stream by spraying a liquid into said gas stream, said device comprising:
    a plurality of conduits for dividing said gas stream into a plurality of separate gas streams, said conduits being substantially unobstructed to permit flow of said separate gas streams therethrough without significant resistance;
    at least one spray nozzle positioned in each said conduit for spraying said liquid into each of said separate gas streams thereby subjecting said entire gas stream to said liquid while passing through said conduits.

2. The device according to claim 1 further comprising a plenum having an inlet for receiving said gas stream and an outlet in fluid communication with said conduits.

3. The device according to claim 2, further comprising a fan in fluid communication with said plenum for forcing said gas stream through said conduits.

4. The device according to claim 1, wherein said conduits are vertically oriented.

5. The device according to claim 1, further comprising a filter positioned within said gas stream upstream of said conduits for removing particulate matter from said gas stream.

6. The device according to claim 1, further comprising a reservoir for holding said liquid, said reservoir being in fluid communication with said spray nozzles for spraying said liquid into said plurality of conduits.

7. The device according to claim 6, further comprising a pump in fluid communication with said reservoir and said nozzles for pumping said liquid from said reservoir to said conduits.

8. The device according to claim 1, further comprising an effluent reservoir in fluid communication with said conduits for collecting liquid effluent from said conduits.

9. The device according to claim 8, further comprising an effluent pump in fluid communication with said conduits and said effluent reservoir for pumping said effluent to said reservoir.

10. The device according to claim 1, further comprising a demister positioned in fluid communication with said conduits for removing liquid from said gas stream exiting said conduits.

11. A device for removing a substance from a gas stream by spraying a liquid into said gas stream, said device comprising:
    a plurality of vertically oriented conduits for dividing said gas stream into a plurality of separate gas streams, each said conduit being substantially unobstructed to permit flow of said separate gas streams therethrough without significant resistance, each said conduit having a first and a second end, said first ends of said conduits being in fluid communication with the atmosphere;
    a plenum having an inlet for receiving said gas stream and an outlet in fluid communication with said second ends of each one of said conduits; and a plurality of spray nozzles positioned one above another in each of said conduits for spraying said liquid into each of said separate gas streams thereby subjecting said entire gas stream to said liquid while passing through said conduits.

12. The device according to claim 11, further comprising a fan in fluid communication with said plenum for forcing said gas stream through said plenum and said conduits.

13. The device according to claim 11, further comprising a demister in fluid communication with said second ends of said conduits.

14. The device according to claim 11, further comprising a filter in fluid communication with said plenum for removing particulate matter from said gas stream.

15. The device according to claim 11, wherein said conduits have a hexagonal cross section.

16. The device according to claim 15, wherein said conduits are arranged adjacent to one another in an array of rows and columns.

17. The device according to claim 11, wherein each of said columns comprises four spray nozzles.

18. The device according to claim 11, further comprising a reservoir in fluid communication with said nozzles.

19. The device according to claim 18, further comprising a pump in fluid communication with said reservoir and said nozzles.

20. The device according to claim 18, further comprising an effluent collector in fluid communication with said conduits.

21. The device according to claim 20, wherein said effluent collector is in fluid communication with said reservoir.

22. The device according to claim 18, further comprising an acid reservoir in fluid communication with said reservoir.

23. The device according to claim 18, further comprising a pH probe in fluid communication with said reservoir and said nozzles, said pH probe generating signals indicative of the acidity of liquid flowing from said reservoir to said conduits.

24. The device according to claim 18, further comprising an electrical conductivity probe operatively associated with said reservoir, said electrical conductivity probe generating signals indicative of a concentration of said substance within said reservoir.

* * * * *